(12) United States Patent
Zaky et al.

(10) Patent No.: US 7,237,193 B1
(45) Date of Patent: Jun. 26, 2007

(54) UNIFIED PROGRAM FOR SIMULTANEOUSLY DISPLAYING GRAPHICALLY-EDITABLE GRAPHICS PRESENTATION AND LINGUISTICALLY-EDITABLE LINGUISTIC DEFINITION OF THE GRAPHICS PRESENTATION AND FOR SYNCHRONIZING THE GRAPHICS PRESENTATION AND THE LINGUISTIC DEFINITION TO ONE ANOTHER

(75) Inventors: Essam Zaky, Mountain View, CA (US); Sami Ben-Romdhane, San Jose, CA (US)

(73) Assignee: Symantec Corporation, Cupertino, CA (US)

( * ) Notice: Subject to any disclaimer, the term of this patent is extended or adjusted under 35 U.S.C. 154(b) by 362 days.

(21) Appl. No.: 10/255,310

(22) Filed: Sep. 25, 2002

Related U.S. Application Data

(63) Continuation of application No. 08/902,388, filed on Jul. 29, 1997, now abandoned.

(51) Int. Cl.
*G06F 15/00* (2006.01)

(52) U.S. Cl. ...................... 715/513; 715/760

(58) Field of Classification Search ............... 715/513, 715/760, 531, 501.1
See application file for complete search history.

(56) References Cited

OTHER PUBLICATIONS

"Adobe Pagemill 2.0 Handbook", Hayden Books, 1996, pp. 16-24, 244-248, 100-109.*
Christle, D., "Sausage Software's HTML authoring Product, HotDog Professional 4.5", 1998, http://www.windowwatch.com/hotdog.html.*
Lemay et al, "Laura Lemay's Workshop Creating Commercial Web Pages", Sams, Aug. 1996, pp. 4-9.*

* cited by examiner

*Primary Examiner*—Cesar B Paula
(74) *Attorney, Agent, or Firm*—Fliesler Meyer LLP

(57) ABSTRACT

A web page development application provides simultaneous display of a browser view and the corresponding descriptor language source view. The application provides graphical editing of the browser view. The corresponding descriptor language source view is automatically generated so as to be consistent with the browser view upon prompting by the user. The web page development application allows separate editing of the browser view and corresponding descriptor language source view and cross-synchronization such that changes to one view will automatically update the other view when prompted by the user.

21 Claims, 10 Drawing Sheets

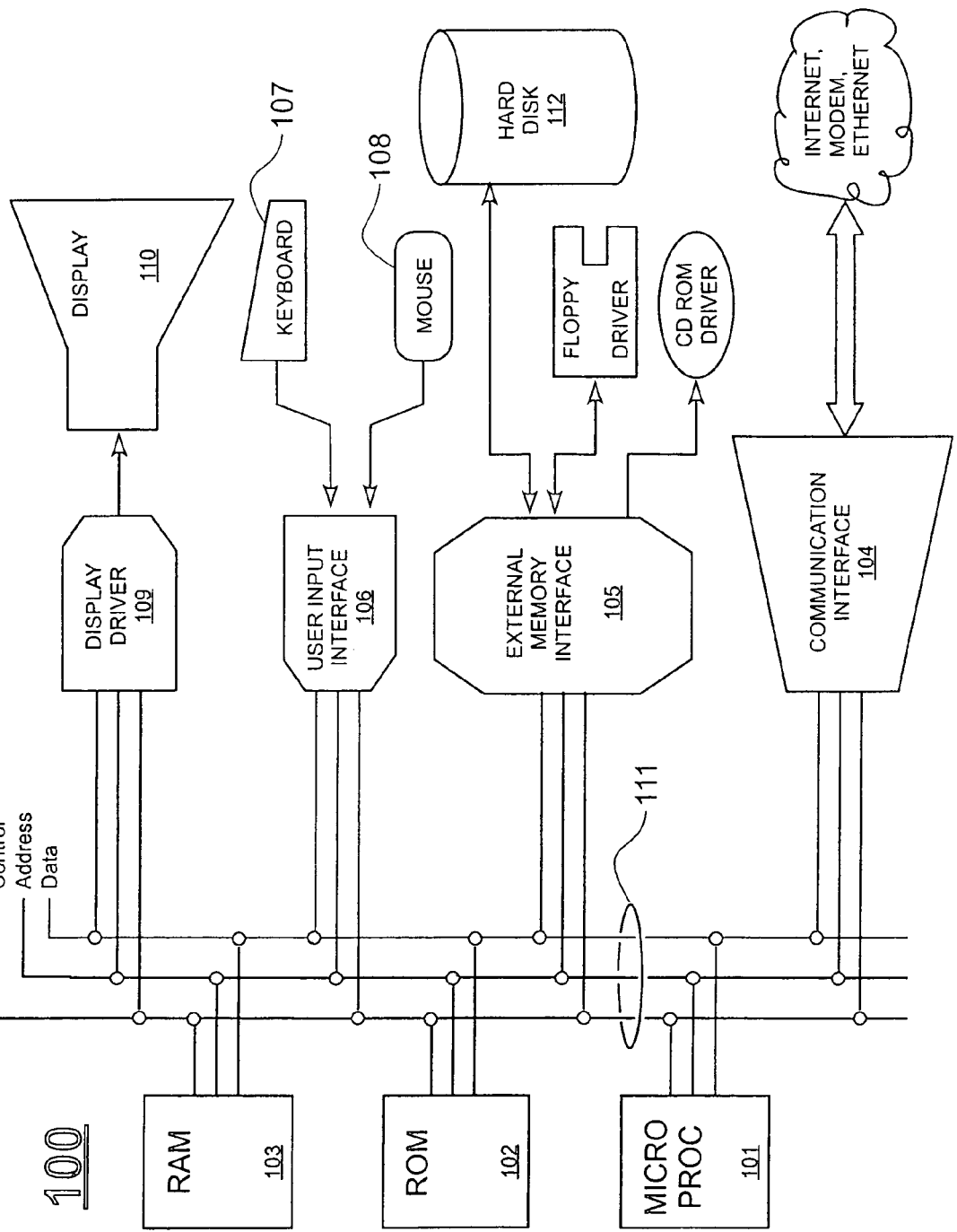

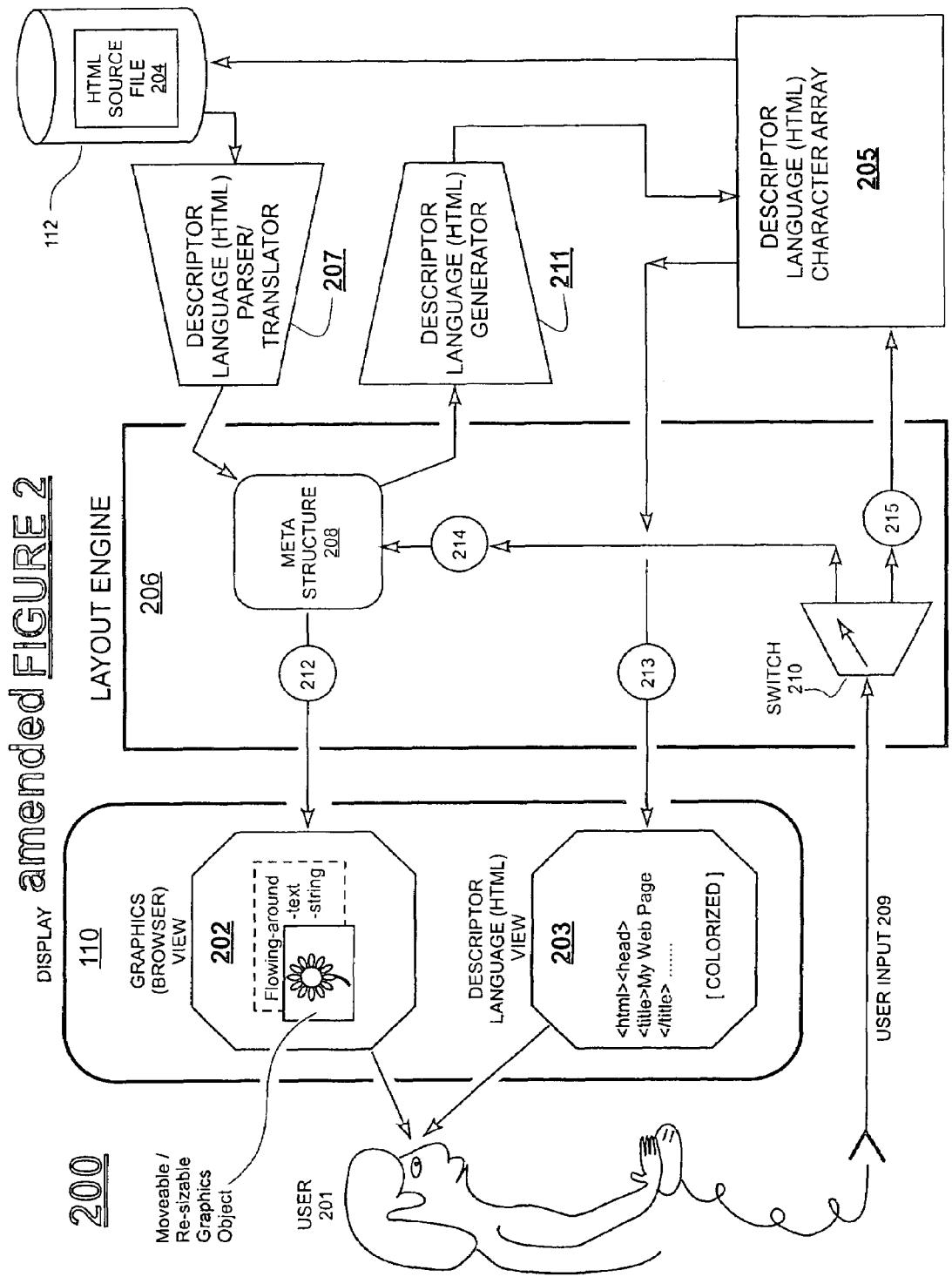

amended FIGURE 3
300
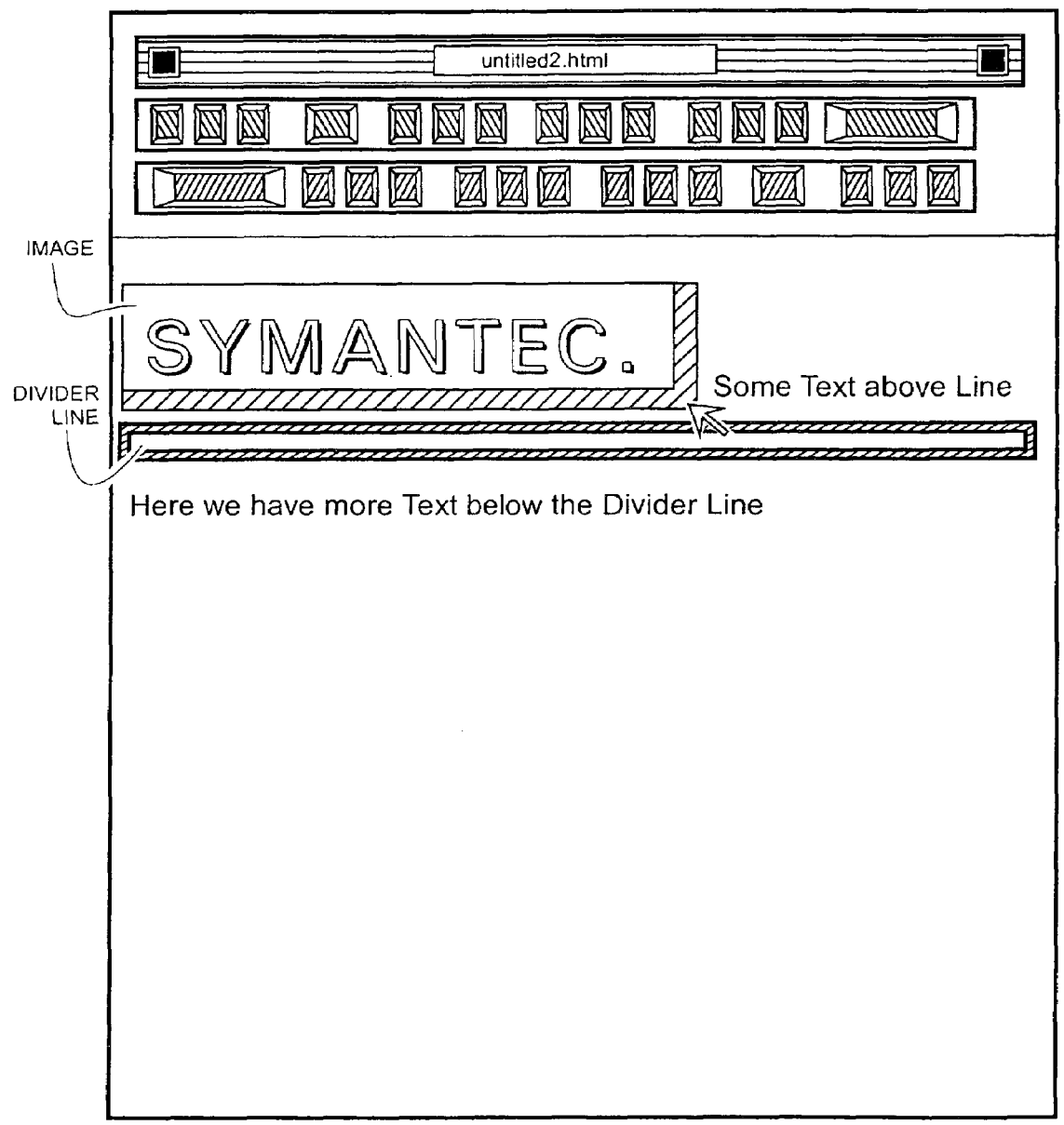

amended FIGURE 4

400    TEXT STORAGE

CHARACTER OFFSET

| # | |
|---|---|
| 1 | IMAGE_1 |
| 2 | S |
| 3 | o |
| 4 | m |
| 5 | e |
| 6 | space |
| 7 | T |
| 8 | e |
| 9 | x |
| 10 | t |
| 11 | space |
| 12 | a |
| 13 | b |
| 14 | o |
| 15 | v |
| 16 | e |
| 17 | space |
| 18 | L |
| 19 | i |

| # | |
|---|---|
| 20 | n |
| 21 | e |
| 22 | LINE_1 |
| 23 | H |
| 24 | e |
| 25 | r |
| 26 | e |
| 27 | space |
| 28 | w |
| 29 | e |
| 30 | space |
| 31 | h |
| 32 | a |
| 33 | v |
| 34 | e |
| 35 | space |
| 36 | m |
| 37 | o |
| 38 | r |
| 39 | e |

| # | |
|---|---|
| 40 | space |
| 41 | T |
| 42 | e |
| 43 | x |
| 44 | t |
| 45 | space |
| 46 | b |
| 47 | e |
| 48 | l |
| 49 | o |
| 50 | w |
| 51 | space |
| 52 | t |
| 53 | h |
| 54 | e |
| 55 | space |
| 56 | D |
| 57 | i |
| 58 | v |
| 59 | i |

| # | |
|---|---|
| 60 | d |
| 61 | e |
| 62 | r |
| 63 | space |
| 64 | L |
| 65 | i |
| 66 | n |
| 67 | e |
| 68 | null |
| 69 | |
| 70 | |
| 71 | |
| ○○○ | ○○○ |

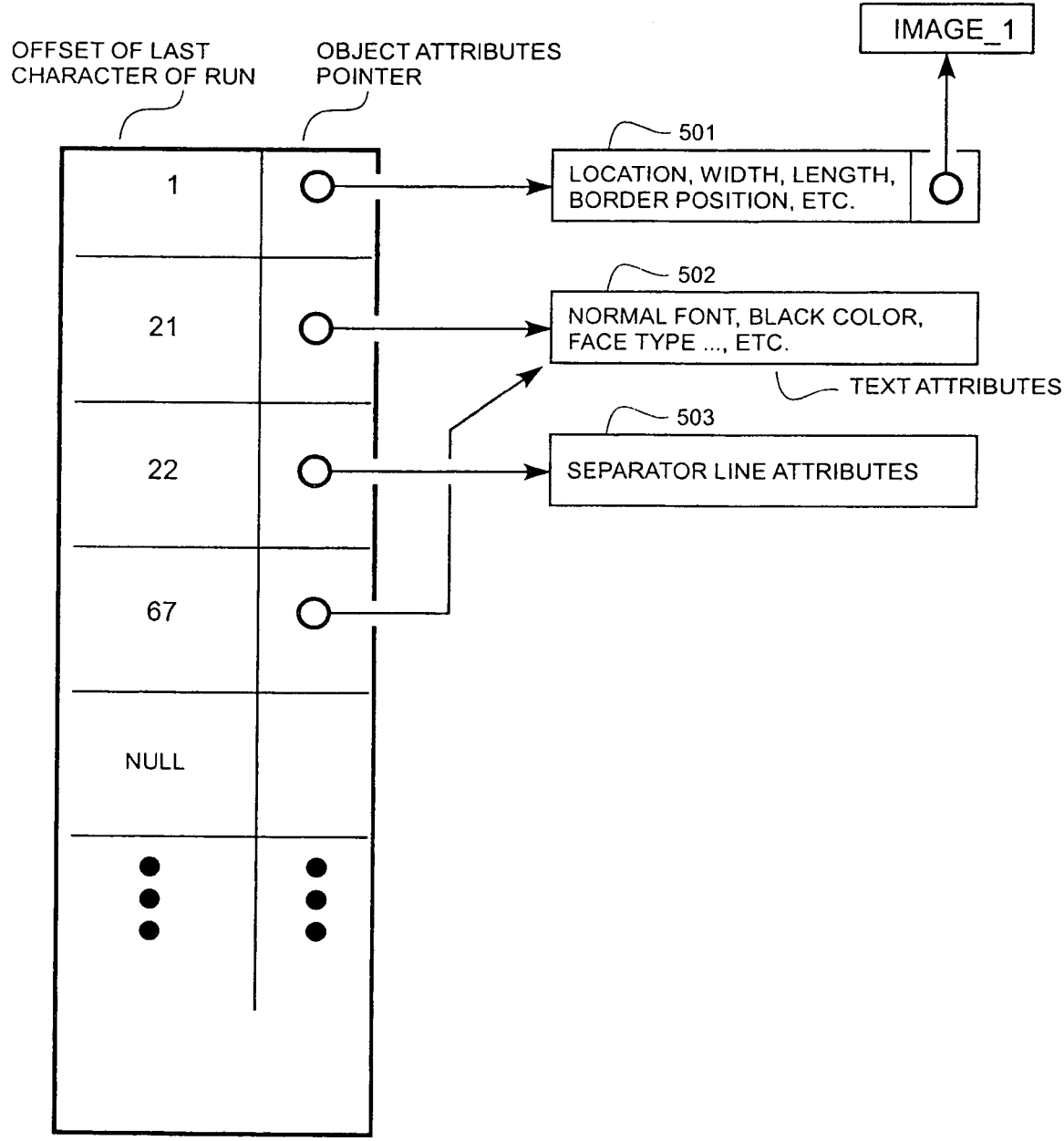

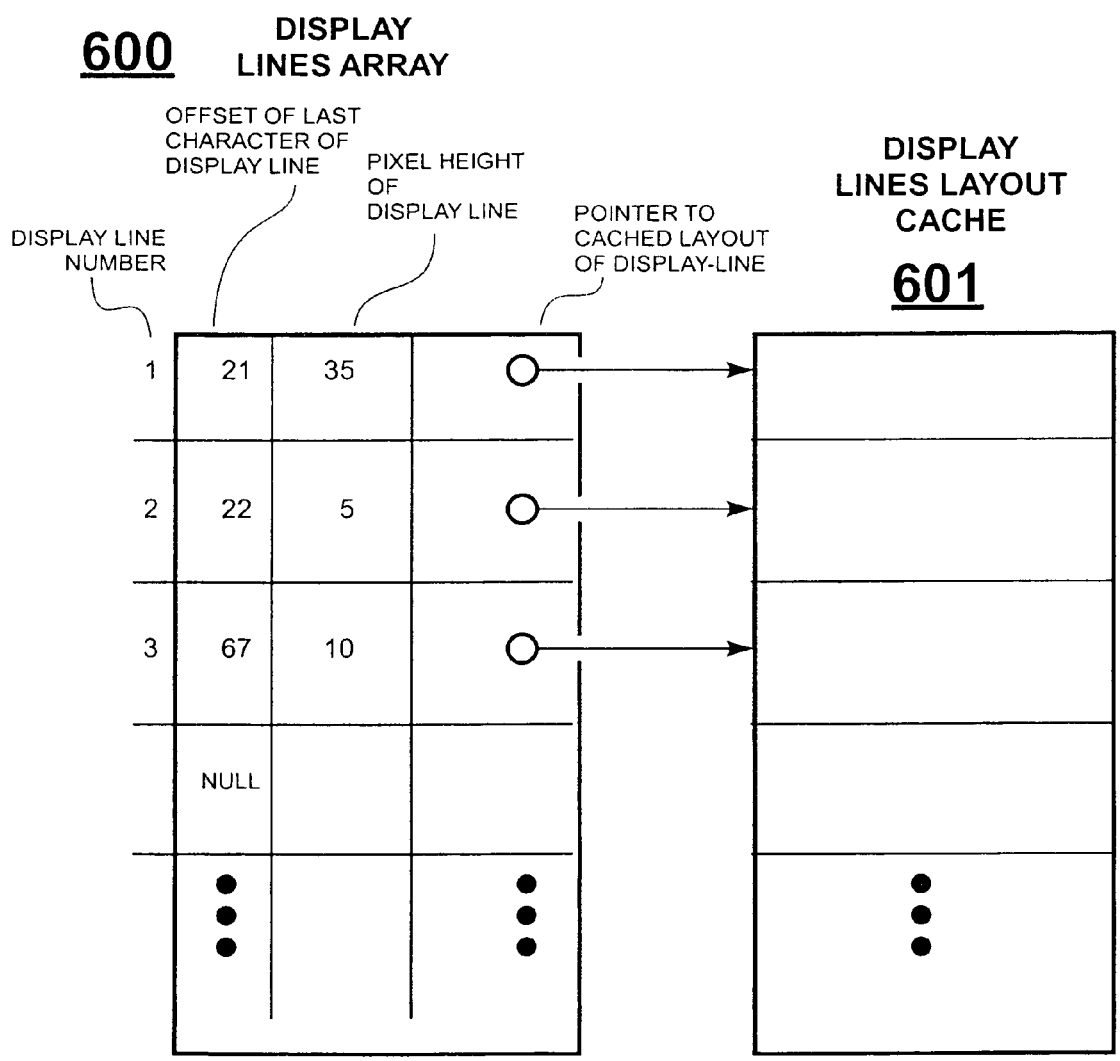
amended FIGURE 6

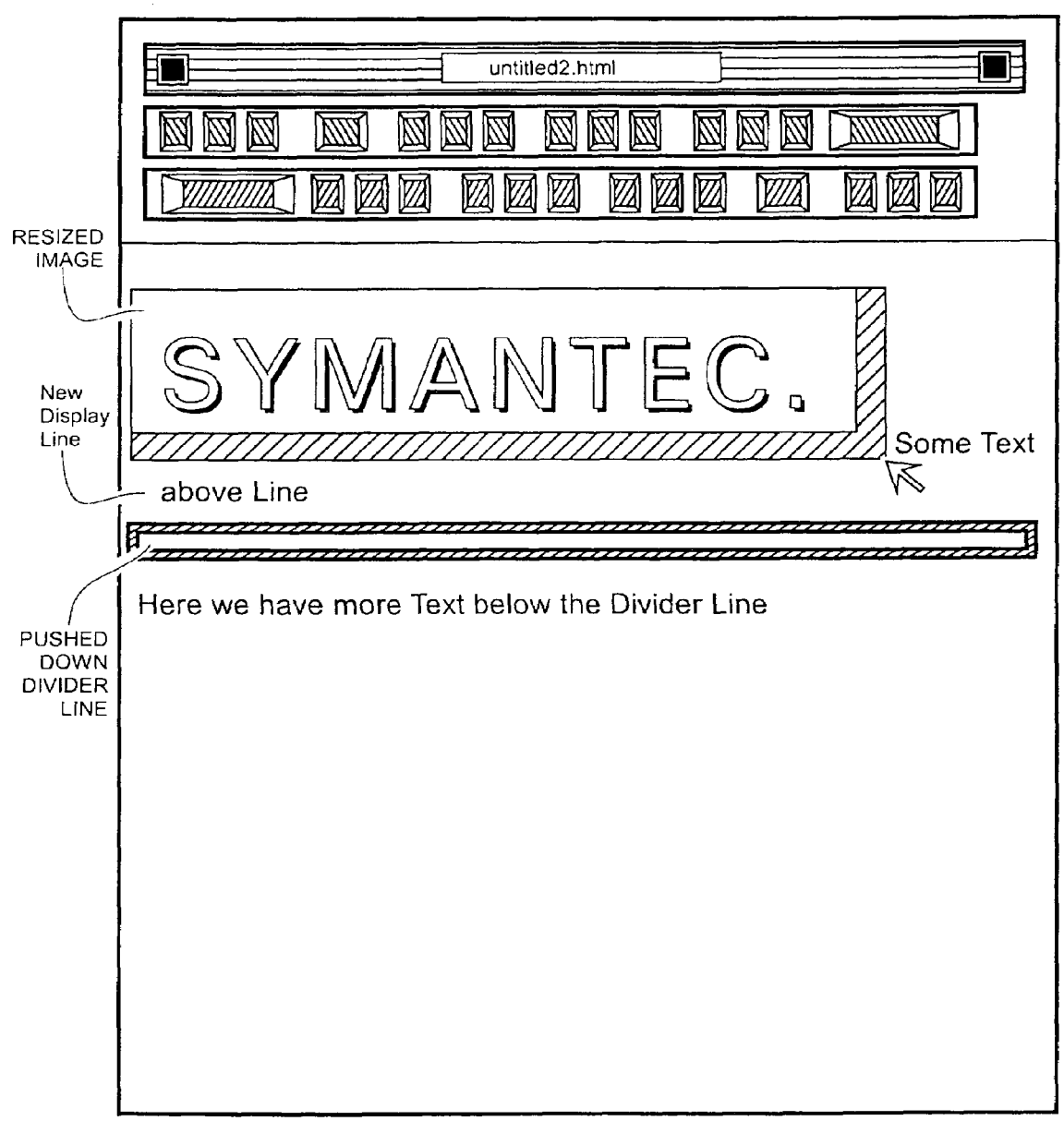
amended FIGURE 7
700

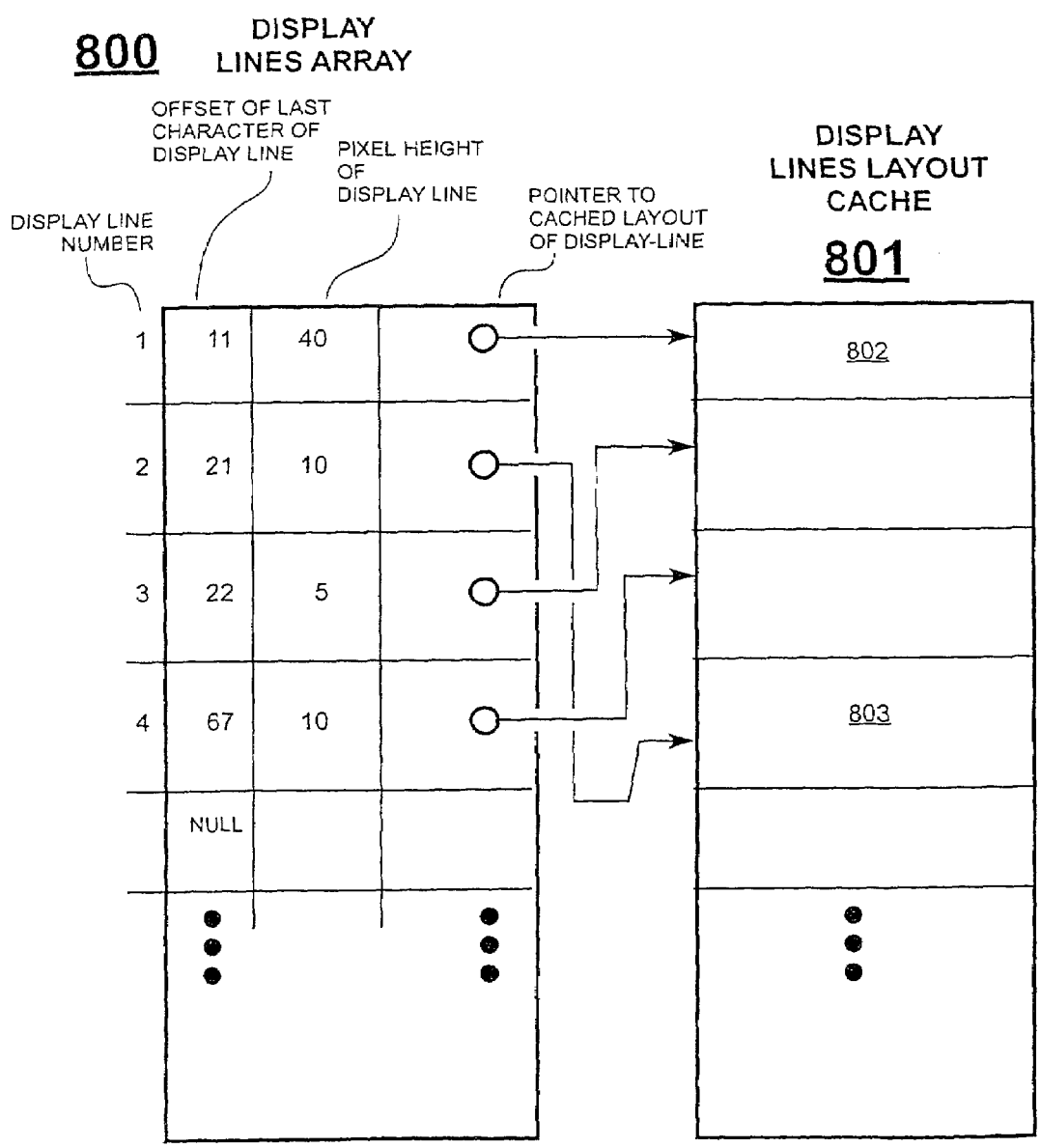
amended FIGURE 8

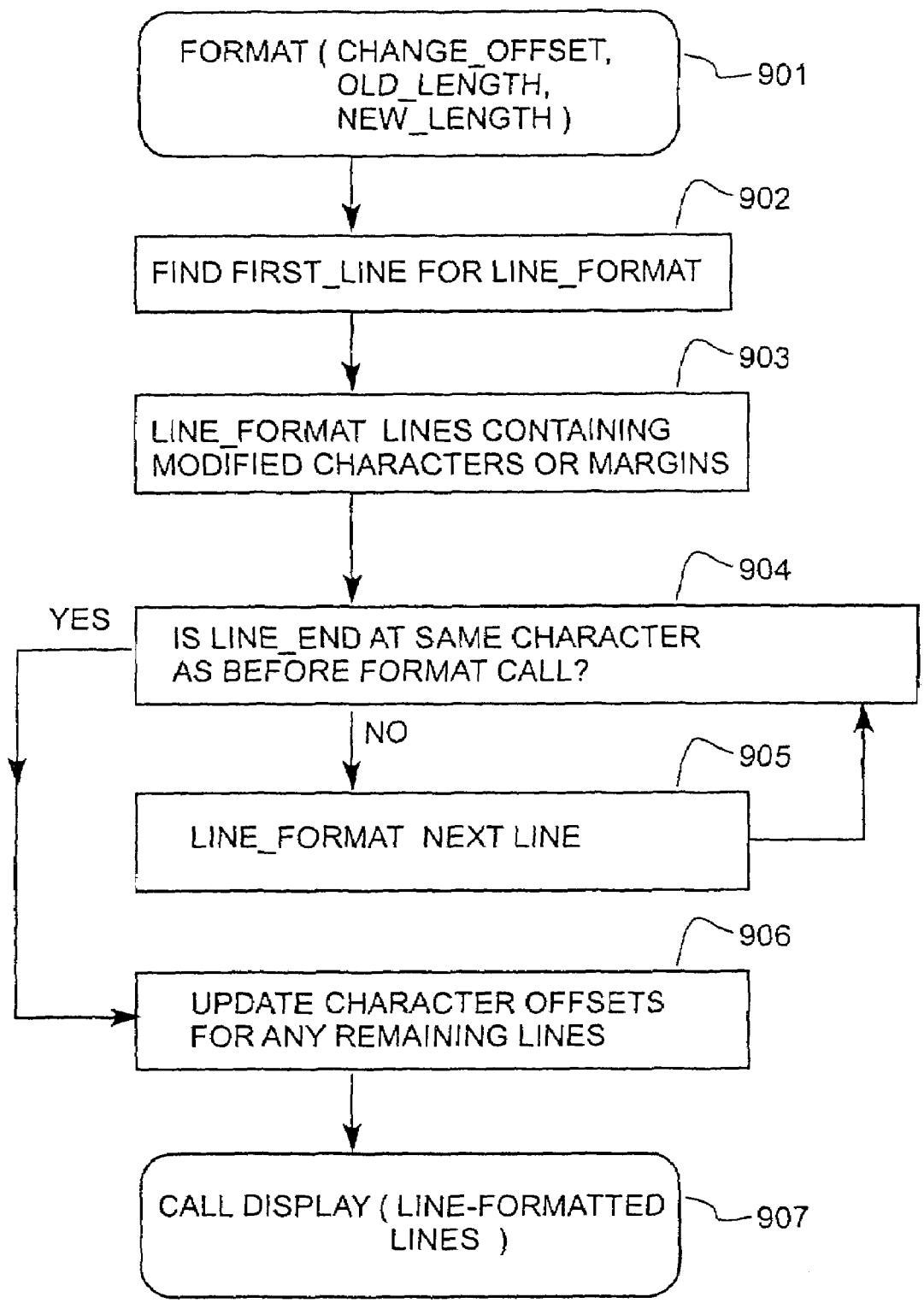
amended FIGURE 9
900 DISPLAY LINE FORMATTING THREAD

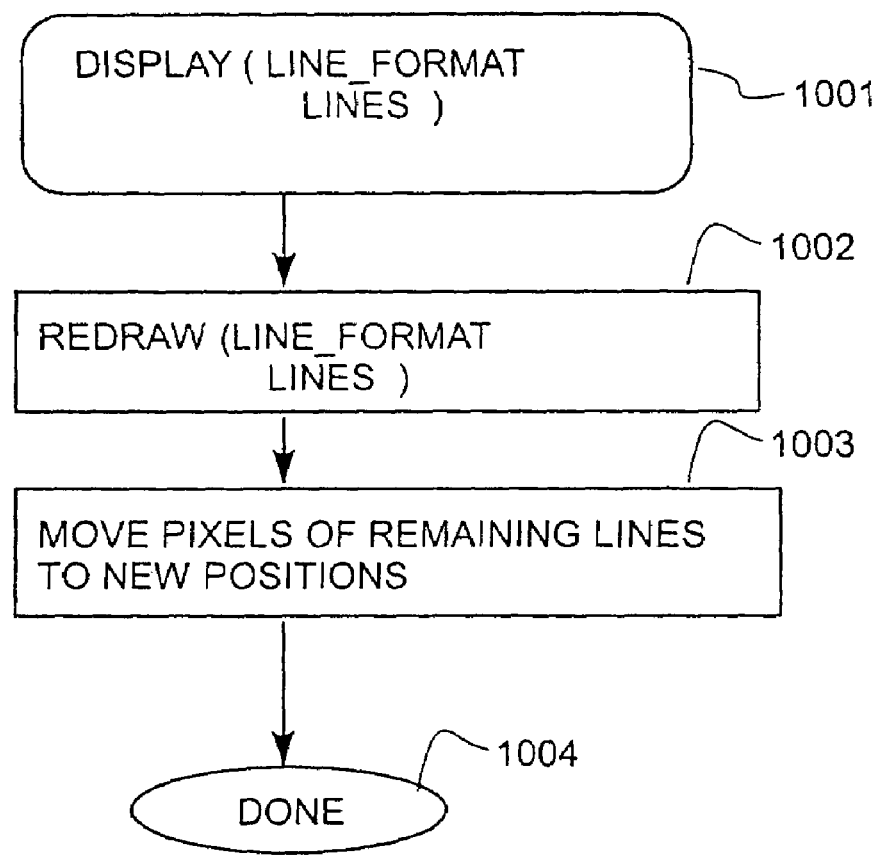

UNIFIED PROGRAM FOR SIMULTANEOUSLY DISPLAYING GRAPHICALLY-EDITABLE GRAPHICS PRESENTATION AND LINGUISTICALLY-EDITABLE LINGUISTIC DEFINITION OF THE GRAPHICS PRESENTATION AND FOR SYNCHRONIZING THE GRAPHICS PRESENTATION AND THE LINGUISTIC DEFINITION TO ONE ANOTHER

CLAIM OF PRIORITY

This application is a continuation of U.S. Ser. No. 08/902,388, filed Jul. 29, 1997, now abandoned. The disclosures of said earlier application is incorporated herein by reference.

BACKGROUND OF THE INVENTION

1. Field of the Invention

The present invention relates to how a linguistic definition of a graphical presentation, such as a Hyper Text Markup Language (HTML) document may be created for reading by graphics presenting programs such as Internet browsers and the like. More specifically, the present invention pertains to real-time direct editing of a browser view of an HTML document.

2. Discussion of Related Art

Graphic presentations such as Internet accessible web pages on the World Wide Web may be linguistically specified in the form of HTML source documents. A web browser program reads the HTML descriptors in an HTML source file to generate and display the corresponding browser view (graphical presentation) of the HTML source file for the user. An end user usually is not interested in the details of the HTML source file which was read to generate the browser view of a web page he is viewing. However, a software developer who is designing a web page will typically want to directly access and edit the HTML source file in order to develop an artistically unique web page.

Conventionally, a software developer designing a web page will create an HTML source file using a text editor application. In order to see the corresponding browser view of the HTML source file, the software developer will invoke a browser application program to read the HTML source file and to generate and display the corresponding browser view. Based upon the viewing of the browser view through the browser application, the developer will modify the HTML source file through the text editor application to effectuate changes to the page.

This conventional development process requires both a browser application and a text editor application, and is somewhat inconvenient because the user must switch back and forth between the two applications to make a change in the HTML source file and then to see the result of the change in the browser view. In addition, the inability to graphically manipulate the browser view requires tedious, time-consuming iteration and specific knowledge of HTML descriptors in order to create the desired appearance of the browser view.

As is apparent from the above discussion, it would be advantageous to have a web page development application which facilitates more convenient and time-efficient development of graphical presentations such as web pages.

3. Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

SUMMARY

Conventional development of graphical presentations such as web pages involves iterative programming in a linguistic format such as HTML using a text editor application, saving the edited linguistic definition as a file, and then reading the saved file in order to view the post-edit result through a graphical presentations displaying program such as an HTML web browser application. This conventional process is inconvenient, time-consuming, and requires specific knowledge of linguistic (e.g., HTML) programming descriptors.

A web page development system in accordance with the present invention provides convenient, fast, and easy development of web pages that are viewable through an HTML web browser or the like. In particular, the present invention involves dynamic real-time formatting and displaying of a browser view of an HTML document in response to the user's editing of the browser view. This real-time formatting and displaying includes real-time image resizing and text reflow. Additionally, the present invention provides for simultaneous viewing and respective graphic or linguistic editing of the corresponding browser view and HTML source view. A graphically edited browser view can be used to automatically generate or update the corresponding HTML source view. The corresponding HTML source view is editable, and can be used to automatically generate or update the corresponding browser view.

According to the present invention, a web page development application provides simultaneous display of a browser view and the corresponding HTML source view.

According to an aspect of the present invention, the web page development application provides graphical editing of the browser view. For example, displayed images can be moved or resized in real time by using drag and drop mouse manipulation techniques, thereby directly demonstrating the graphic effects of editing on the screen layout that will be seen by the end user. Text can be added or deleted in the browser view.

According to another aspect of the present invention, the corresponding HTML source view is automatically generated so as to be consistent with the browser view upon prompting (e.g., single click cuing) by the developer. Therefore, a user can graphically develop a browser view and capture the corresponding HTML document which specifies the modified browser view without ever having to manually edit specific codes within any HTML document. The web page development application according to the present invention also provides generation and display of a user-editable browser view from a linguistically-edited HTML document.

According to yet another aspect of the present invention, a web page development application provides that the browser view and corresponding HTML source view can be individually edited such that individual changes made to one view will automatically update the other view when prompted (cued) by the user. After editing one view, one such prompt to update the other view is simply to select the other view by clicking the mouse in the other view. In this manner, both the browser view (a graphical presentation) and the HTML source view (a corresponding linguistic representation) are easily synchronized with one another so as to reflect the current state of the web page being edited.

According to still another aspect of the present invention, at all times during graphical editing of the browser view, the browser view shows to the user the edited screen layout as it would appear through an HTML web browser reading the HTML document as then generated by the web page development application at that time. In other words, the screen layout of the browser view is continuously updated in real time during a graphical editing operation rather than only once at the end of the graphical editing operation. For example, the resizing of an image using a drag and drop mouse manipulation causes continuous reformatting and redisplay of the image and any reflow of the surrounding text about the image during the dragging, rather than only after the drop. This useful feature provides instantaneous feedback to the user as to the effect that a graphical editing operation will have upon the formatting and appearance of the screen layout. In order to perform this continuous formatting and display, the web page development application according to the present invention maintains the configuration of the web page as an optimized meta-structure. The web page development application uses this meta-structure to generate both the browser view and an HTML character array that may in turn be used to generate the HTML source view.

These and other features, aspects, and advantages of the present invention will become apparent from the below Detailed Description of the Invention in conjunction with the corresponding Figures.

BRIEF DESCRIPTION OF THE DRAWINGS

FIG. 1 is a system block diagram of a general purpose computer suitable for running a web page development application according to the present invention.

FIG. 2 is a logical block diagram illustrating the various software elements, data flow, structures, and files in a web page development application according to the present invention.

FIG. 3 illustrates a browser view of a web page being edited using a web page development application according to the present invention.

FIG. 4 is a logical representation of the contents of a text storage object which may be provided within a meta-structure of a layout engine of a web page development application according to the present invention, where the illustrated contents correspond to the browser view shown in FIG. 3.

FIG. 5 is a logical representation of the contents of an object array which may be provided within the meta-structure of the layout engine of the web page development application according to the present invention, where the illustrated contents correspond to the browser view shown in FIG. 3.

FIG. 6 is a logical representation of a line array and line layout cache which may be provided within the meta-structure of the layout engine of the web page development application according to the present invention, where the illustrated contents correspond to the browser view shown in FIG. 3.

FIG. 7 illustrates an updated browser view resulting from an image resize operation performed on the browser view illustrated in FIG. 3.

FIG. 8 is a logical representation of contents of the line array and line layout cache in the meta-structure of the layout engine of the web page development application, where the illustrated contents correspond to the browser view shown in FIG. 7, which is the result of an image resize operation performed on the initial browser view illustrated in FIG. 3.

FIG. 9 is a flowchart illustrating a sequence of steps performed by a web page development application according to the present invention, where the illustrated steps occur during a format operation.

FIG. 10 is a flowchart illustrating a sequence of steps performed by a web page development application according to the present invention, where the illustrated steps occur during a display operation.

The Figures are more fully explained in the below Detailed Description

DETAILED DESCRIPTION

Conventional web page development involved an iterative process comprised of tedious HTML programming through use of an editing program, then saving of the edited HTML results, and then viewing through a browser program to assess the results of the HTML programming. A web page development application according to the present invention can provide direct, graphical editing of the browser view including real-time resizing of images and real-time text reflow, and also can provide automatic HTML source generation and editing capabilities. By 'real time' it is meant that the human developer perceives corresponding machine responses to his or her editing requests as happening essentially instantaneously (e.g., within 300 milliseconds). In the context of the description of the present invention, the term "web page" refers to a displayable graphic design which is specified by a descriptor language.

FIG. 1 illustrates a computer architecture block diagram of a standard general purpose computer 100 suitable for executing the web page development application according to the present invention. The general purpose computer 100 includes a microprocessor 101, a read-only memory 102, and a random access memory 103. A communication interface 104 provides input and output to the computer 100 through one or more external communication channels (including those defined by Internet and Ethernet). An external memory interface 105 provides the computer with input and output to one or more large capacity memory storage devices such as a hard disk 112. A user input interface 106 allows the computer operator to provide input to the computer through devices such as a standard keyboard 107 and a mouse 108. A display driver 109 provides visual output from the computer to a display monitor 110. An internal bus 111 provides internal communication between the various computer elements.

It is to be understood that the computer architecture 100 illustrated in FIG. 1 is offered by way of example, not by way of limitation. For example, the computer 100 could alternatively use more than one internal communication bus, could include non-volatile flash memory, could include various additional math, graphics, or cryptographic processors, could have more or fewer external memory storage devices, could include more user input mechanisms, and could have additional user output mechanisms such as speakers. All such implementations of a general purpose computer 100 are capable of running the web page development application according to the present invention.

FIG. 2 is a logical block diagram illustrating hardware and software elements that may be used, and data flows that may be employed for the creation of web-page defining files in a web page development system 200 according to the present invention. Upon invoking (activating) the web page development application that produces elements shown in FIG. 2, the display 110 presents to the user 201 a blank browser view 202, which the user 201 may begin to fill in as desired. Instead of filling in a blank browser view, the user 201 has the capability to open, on the display 110, a pre-designed browser view 202 whose design is defined by an existing HTML source file 204 which is accessible to the computer 100 for example through its data storage interface 105 or its communication interface 104. The existing HTML source file 204 is typically stored on the hard disk 112. If an existing HTML source file 204 is opened, an HTML parser translator 207 parses the HTML source file 205 and creates from it a meta-structure 208 within the layout engine 206. The meta-structure 208 contains all the information necessary to create the browser view 202 according to the definitions provided within the existing HTML source file 204 and the created meta-structure 208 further contains all information necessary for generating an HTML character array 205. This HTML character array 205 can be saved back to the disk 112 to function as a replacement equivalent of the original HTML source file 204.

Display 110 is driven by a first display-driving object 212 that is provided within a layout engine 206 and is used to generate the browser view 202 from the meta structure 208. As seen in FIG. 2, the layout engine 206 is operatively coupled to a user input device such as a mouse 108. The layout engine 110 is also operatively coupled to a descriptor-language (e.g., HTML) parser/translator 207, a descriptor-language (e.g., HTML) generator 211, and a descriptor-language (e.g., HTML) character array 205. Within the layout engine 206, there is a meta structure 208 that includes all necessary information for allowing the first display-driving object 212 to display the browser view 202 and to allow the descriptor-language (e.g., HTML) generator 211 to create the descriptor-language (e.g., HTML) character array 205. There is also a user input switch 210 that performs the function of directing user control inputs 209 to either the meta structure 208 or the HTML character array 205 (via modification processing elements 214 and 215 respectively). The display 110 shows the browser view 202 without the source view or the display 110 shows both the browser view 202 and the HTML source view 203 simultaneously.

Once the meta-structure 208 is created, the layout engine 206 uses its first display-driving object 212 for processing the meta-structure 208 to thereby produce the corresponding browser view 202 on the user's display 110. The meta-structure 208 is efficiently organized so as to facilitate rapid editing, formatting, and display by the layout engine 206, as will be described in greater detail below.

If the user 201 elects to open an HTML source view 203 corresponding to the browser view 202 being displayed, the descriptor-language (e.g., HTML) generator 211 processes the meta-structure 208 of the layout engine 206 and creates the corresponding descriptor-language (e.g., HTML) character array 205, where the created character array 205 essentially represents the descriptor-language (e.g., HTML) source code which will, under the in-use descriptor-language (e.g., HTML) specify the user created/modified browser view 202. The layout engine 206 then uses its second display-driving object 213 for processing the HTML character array 205 to produce and optionally display the corresponding descriptor-language (e.g., HTML) source view 203. The layout engine 206 then displays in a window of display 110, either the descriptor-language (e.g., HTML) character array 205 directly or the correspondingly produced descriptor-language (e.g., HTML) source view 203 in a manner similar to the way that a conventional text editor displays such a document. However, unlike a conventional text editor, for added convenience of the user 201, the descriptor-language (e.g., HTML) source view 203 shows its respective descriptors, text, and other descriptor-language (e.g., HTML) codes in different colors to assist the user 201 in editing the source view 203.

The user's modifications 209 come through the keyboard 107 or mouse 108 or other appropriate user input means. A software switch 210 in the layout engine 206 determines which view is being modified. If the descriptor-language (e.g., HTML) source view 203 is being modified, the software switch 210 directs the user's modifications 209, as appropriately processed by a third processing object 215 of the layout engine 206 into the descriptor-language (e.g., HTML) character array 205. If the browser view 202 is being modified, the software switch 210 directs the user's modifications 209 as appropriately processed 214 by the layout engine 206 into the meta-structure 208. As the user's modifications 209 are being directed (via switch 210) either to the descriptor-language (e.g., HTML) character array 205 or to the meta-structure 208 and the so directed modifications 209 are being appropriately processed by respective element 215 or 214 of the layout engine 206, the layout engine 206 is also formatting and displaying the view being modified on the user's display monitor 110.

If, as a first example, the user's input 209 has modified the graphical browser view 202 through the meta-structure 208, there can be a short time period wherein the descriptor-language (e.g., HTML) character array 205 and the corresponding descriptor-language (e.g., HTML) source view 203, if the latter is open, are temporarily out of synchronization with the browser view 202 and the meta-structure 208.

Similarly and as a second example, if the user's input 209 has modified the descriptor-language (e.g., HTML) source view 203 through the descriptor-language (e.g., HTML) character array 205, then there can be a short time period wherein the meta-structure 208 and the corresponding graphics (e.g., browser) view 202 are temporarily out of synchronization with the descriptor-language (e.g., HTML) source view 203 and with the descriptor-language (e.g., HTML) character array 205.

In order to synchronize the graphics (e.g., browser) view 202 to reflect the changes made in the modified descriptor-language (e.g., HTML) character array 205, the modified HTML character array 205 is parsed and translated by the descriptor-language (e.g., HTML) parser/translator 207 into the meta-structure 208 within the layout engine 206. The layout engine 206 then formats and displays (by use of first display-driving object 212) the updated browser view 202 so that it is consistent with the descriptor-language (e.g., HTML) source view 203.

In order to synchronize the descriptor-language (e.g., HTML) source view 203 to reflect the changes made in the modified meta-structure 208, the descriptor-language (e.g., HTML) generator 211 is used to translate the modified meta-structure 208 into an updated version of the descriptor-language (e.g., HTML) character array 205. The layout engine 206 then formats and displays (by use of second display-driving object 213) the updated source view 203 so that the latter is consistent with the browser view 202.

In one embodiment, in order to synchronize the views, the user 201 must provide some cue to the web page development application to indicate which view needs updating. According to the present invention, selecting of a stale view is taken as a cue to synchronize the stale view to its corresponding modified view. Such a selecting of a stale view can occur by mouse clicking anywhere on a window displaying the stale view. Another cue is mouse clicking on a special button on the web page development application's control panel; and yet another cue is pressing a designated key on the keyboard.

When the user 201 desires to save the result of an editing session to a descriptor-language (e.g., HTML) source file 204 on disk 112, the corresponding character array 205 is written to disk 112. In one embodiment, the descriptor-language (e.g., HTML) character array 205 is always initially created by the descriptor-language (e.g., HTML) generator 211 from the meta-structure 208. Therefore, any HTML source file 204 which is written to the disk 112 by the web page development application is likely to be different from the original HTML source file 204 which was read from the disk 112 by the web page development application, even if no changes were made to the graphics 202 or descriptor language 203 views. An exception to this rule is the case where no changes were made and the descriptor-language (e.g., HTML) source file 204 which was read was created by the web page development application. However, if no edits are made, the source file 204 which is written onto disk 112 from array 205 will produce the same browser view when viewed through any same descriptor-language (e.g., HTML) browser as the graphics view produced from the original source file 204 which was read, even though the original and rewritten source files 204 may be slightly different.

According to another aspect of the present invention, the editing of the browser view 202 occurs in real time, such that the editing includes real-time image resizing and real-time text reflow. A change is deemed to occur in "real time" if the change occurs in a very short time which is perceived by the user 201 to be instantaneous.

For example, FIG. 3 illustrates a browser view 300 of a simple web page which includes a rectangular image area containing an image of, in this example, a stylized banner of the company name: "SYMANTEC." The illustrated web page further includes: two text runs and a horizontal divider line between the upper and lower text runs. If the user 201 decides to edit both the height and width of the image area ("SYMANTEC.") by graphically resizing it, he grabs the image by lower right corner by placing the mouse cursor on the lower right corner of the image and depressing a mouse button. (The user 201 may also edit only the height by grabbing midpoint of the bottom edge of the image, or may edit only the width by grabbing the midpoint of the right edge of the image.) While the mouse button is depressed, the image can be resized by dragging the mouse cursor anywhere on the browser view 300. When the mouse button is released, the height and width of the image will have been changed so as to correspond to the position of the mouse cursor at the time the mouse button was released.

The height and width of the image are adjusted in real time as the mouse cursor is moving about the browser view 300. Furthermore, the image itself is resized in real time, so that the image inside the rectangular border of the image is updated in real time. Moreover, the reformatting and displaying (reflow) of the text which is surrounding the image is also performed in real-time, so that at all times during the dragging of the mouse during the image resize operation, the browser view 300 appears as it would finally appear should the mouse button be released and should the corner of the image be dropped at the current position of the mouse cursor.

This real-time image resizing and real-time text reflow is very important as it provides the user with instantaneous feedback as to the result of a proposed image resizing operation. There are no surprises when the mouse button is released as to either the image appearance or the effect of the image resize upon the reformatting of the surrounding text. The browser view 300 is at all times (as perceived by the user) current during image resizing operations.

In order to support real-time recalculation and redisplay of the screen layout, according to the present invention, an optimized meta-structure 208 is implemented in the layout engine 206. The optimized meta-structure 208 includes a text storage structure (e.g., FIG. 4), a graphics-objects defining array (e.g., an HTML object array, see FIG. 5), a line-separating array (e.g., 600 of FIG. 6), and a line layout cache (e.g., 601 of FIG. 6).

FIG. 4 illustrates a logical view of the text storage structure 400 that may be used within the meta-structure 208 for corresponding to the browser view illustrated in FIG. 3. The text storage 400 is a logically structured array of characters or character codes. The image area ("SYMANTEC.") of FIG. 3 is represented in FIG. 4 by a special character "IMAGE_1" and is shown as being the first character of the text storage structure 400. Each character of the first text run "Some Text above Line" is represented in the text storage 400 by a respective one of subsequent characters 2 through 21. The horizontal separator line is represented in the text storage structure 400 by another special character, "LINE_1" located at character offset position 22. Each character of the second text run "Here we have more Text below the Divider Line" is represented in the text storage structure 400 as respective characters in successive character offset positions 23–67. The "null" character of offset position 68 represents the end of the stored text of the text storage structure 400. The position of any character within the text storage 400 is referred to herein as the character offset of that character.

FIG. 5 illustrates a logical view of a graphics-objects defining array (e.g., an HTML object array) 500 according to the present invention. Every displayable object has corresponding object display specifications. Examples of displayable objects are images, java applets, radio buttons, check boxes, tables, and text runs, where the latter runs may have text attributes such as face, color, and font. A text run is a series of adjacent characters in the text storage structure 400 which share a same set of object display specifications. The object array 500 represents a list of text runs. Each row entry of the illustrated object array 500 includes the character offset of the last character in the corresponding text run and a pointer to the object display specifications corresponding to the text run. Because the "SYMANTEC." image (see FIG. 3) is a single character text run, and it is by definition the last character of its respective run as well as the first, the character offset of the first entry in the object array 500 is 1. The object attributes specification 501 corresponding to the image ("SYMANTEC.") includes the location, width, length, and border position of the image, as well as a pointer to the image itself (IMAGE_1).

The second row entry of the object array 500 includes the character offset of the end of the text run "Some Text above Line" and a pointer to the text attributes 502 corresponding to the text run. The third row entry of the object array 500 represents the single character text run represented by the horizontal separator line. The object specifications 503 pointed to by the third row entry gives the attributes (height, for example) of the separator line. The fourth row entry of the object array 500 gives the character offset of the text run "Here we have more text below the Divider Line". Because the displayable text attributes of the text run "Here we have more text below the Divider Line" are the same as the displayable text attributes of the text run "Some Text above Line", the two text runs share the same object specification 502. If the text run "Here we have more text below the Divider Line" had been in a different font than the text run "Some Text above Line", then the two text runs would have separate object specifications. The null character represents the end of the object array 500.

FIG. 6 illustrates a logical view of a display-lines separating array 600 corresponding to the screen layout of the browser view 300 illustrated in FIG. 3 (which view has 3 display lines as shall be explained). The display-lines array 600 includes the character offset of the last character in a given display line. Because the "SYMANTEC." image and the text run "Some Text above Line" are formatted so as to be on the same display line, the character offset of the end of the first display line is the last character in the text run "Some Text above Line". The second display line is occupied by the horizontal separator line. The third display line is constituted by the text run "Here we have more text below the Divider Line".

For each entry row, the line array 600 also includes the pixel height of the corresponding display line, and a pointer to an entry in a line layout cache 601. Each entry in the line layout cache 601 stores the line layout for the corresponding display line. Ideally, to facilitate faster screen drawing, the line layout for all lines being displayed in the browser view 300 can be cached in the line layout cache 601. However, in the event that the line layout for all display lines cannot be cached in the line layout cache 601 due to memory constraints, the line layout cache 601 uses a cache replacement strategy to store selected line layouts. For example, all redrawn lines are cached, and the least recently drawn line is deleted from the cache to make room for the most recently redrawn line.

FIG. 7 illustrates a browser view 700 resulting from an image resize operation performed on the browser view 300 shown in FIG. 3. The "SYMANTEC." image in FIG. 3 was horizontally and vertically stretched using a drag and drop technique. The image was horizontally stretched so that only the words "Some Text" could fit on the first display line, while the remaining words "above Line" in the text run had to be placed on another display line. As a result of this image resizing operation, neither the text storage structure 400 nor the object array 500 were altered; however, the display lines array 600 and the display lines layout cache 601 changed to reflect the change in the screen layout. Although the object array 500 of FIG. 5 was not altered, the object specifications 501 of the "SYMANTEC." image was altered to reflect the new height and width of the resized image.

Referring to FIG. 8, the illustrated display lines array 800 represents the new state of the display lines after the image resizing operation. The character offset of the first line is changed to indicate that the end of the first line occurs in the middle of the text run "Some Text above Line". The second display line in the line array 800 is a new display line and includes the words "above Line" which were wrapped around onto the new display line. The third and fourth display lines in the line array 800 are pushed down in displayed position but are otherwise the same as the second and third lines in the line array 600 before the image resize operation. Both the first line layout 802 and the second line layout 803 were computed as a result of the image resize operation. The height of the first line was increased from 35 to 40 to reflect the increase in pixel height of the resized image.

According to the present invention, to take benefit of the fact that the user's production of input 209 (FIG. 2) is generally much slower than the speed of the microprocessor 101, the formatter runs in a separate thread that executes in parallel to the processing of the user's input 209. FIG. 9 is a flowchart representing the steps followed by a formatter thread according to the present invention. A formatter thread operates on graphic objects and entries of the display line array corresponding to one or more adjacent characters in the text storage structure 400 (FIG. 4). Instead of reformatting the entire browser view, the web page development application according to the present invention line formats only those display lines which need to be reformatted, and modifies only the necessary graphics objects. This selective formatting aids in providing real-time image resizing and real-time text reflow.

When the formatter is invoked at step 901, it is passed the character offset (CHANGE_OFFSET) of the first character in the display line being modified, the number of characters which existed prior to the modification (OLD_LENGTH), and the number of characters which exist after the modification (NEW_LENGTH). Thus, the format operation can be thought of as FORMAT (CHANGE_OFFSET, OLD_LENGTH, NEW_LENGTH). For example, if a ten character-long new text string (e.g., "Horizontal") were pasted in place of the 4-character "Line" at the end of the string, "Some Text above Line" in the browser view 300 shown in FIG. 3, the formatter thread would be invoked as FORMAT (18, 4, 10) to indicate a change beginning at position 18 which replaces the 4-character string "Line" with the 10-character string "Horizontal". The image resize operation described above invokes the formatter with FORMAT(1,1, 1).

At step 902, the formatter determines which is the first display line needing to be line formatted. Line formatting computes the line end character offset and the line height. In general, the first display line to be line formatted is the line preceding the line which contains the first modified character. Because an editing operation beginning at a certain character may cause an additional word to fit onto the previous display line, the line end character offset of the line preceding the line which contains the first modified character may change as a result of an editing operation. The formatter thread always line formats either a single display line or a contiguous blocks of adjacent lines. Thus, the formatter begins at a first line and continues with subsequent lines until it determines that it can stop formatting. At step 903, the formatter line formats the display lines containing modified characters or modified margins. The last line which contains a modified character is the line containing the larger of the character offset CHANGE_OFFSET+OLD_LENGTH and the character offset CHANGE_OFFSET+NEW_LENGTH. Images and other graphical objects are normally positioned with their lower left hand corners at the place in the line at which their character offset is located. Therefore the height and width of an image of other graphical object will normally affect only the line containing the image's character offset. However, by changing the justification attribute of an image or other graphical object, its height and width can change the left or right margins of subsequent lines. Therefore, the formatter at step 903 also line formats any lines having altered margins.

The line formatting of one display line can potentially cause the next line to need line formatting because the line end character offset may change, thereby changing the beginning character of the next display line. Therefore, after all contiguous lines containing modified characters and margins have been line formatted, the formatter continues line formatting subsequent lines until it reaches a line ending in the same character as before the editing operation. Test 904 determines whether or not the new line end character offset of the most recently line format is the old line end character before the edit. If the line end is in the same place, then the formatter updates all remaining lines end to reflect the change in the preceding number of characters resulting from the edit operation. If the line end is not in the same place, then the formatter line formats the next line in step 905 and tests again in step 904.

Therefore, when the line end is computed during a subsequent line format, if it is the same as the line end character offset plus NEW_LENGTH minus OLD_LENGTH of an entry in the line array prior to the editing operation, then all subsequent line heights in the new line array are the same as the subsequent line heights in the old line array, and all subsequent line ends in the new line array are the same as the subsequent line ends of the old line array plus NEW_LENGTH minus OLD_LENGTH. At step 907, the formatter is finished and calls the first display-driving object (212) to redraw all lines which were line formatted, and to update the screen.

FIG. 10 illustrates the steps in the display process. The display-driving object is called by the formatter at step 1001 and receives as input the range of lines which must be redrawn. The lines which must be redrawn are all lines which were line formatted by the formatter (in steps 903 and 905). At step 1002, the display object redraws the line formatted lines and updates the line layout cache 801 to include the newly drawn display lines.

In order to increase performance, lines subsequent to the redrawn line formatted lines are simply copied to their new positions, rather than being redrawn. The lines which can be copied in this manner correspond to the lines whose line end character offsets were updated in step 906. At step 1003, the display object copies pixels from all subsequent lines to their new screen locations. The sum of the lines heights of the redrawn line formatted lines (MOD_HEIGHT) is computed using the line array. The difference in the final total lines height from initial total lines height (DELTA_HEIGHT) is computed using the line array. All pixels lower than MOD_HEIGHT plus the pixel position of the line previous to the line containing the character offset of the first modified character are moved from their current position to their current position plus DELTA_HEIGHT.

At step 1004, the redisplay of the browser view 700 is complete, and the web page development application is ready to accept new user input 209. During an image resize operation using mouse dragging, according to the present invention the above-described formatting and displaying is performed so quickly that the screen is updated in real-time in response to the user 201 dragging the mouse. In other words, the reformatting and redisplay occurs before the user is able to move the mouse to the next pixel location as he is dragging the mouse. However, in the event that the screen is not fully updated before the web page development application sees the next mouse movement, then another formatter thread is started.

The web page development application according to the present invention may be implemented as an object-oriented program. In such an object-oriented embodiment, the layout engine 206 within the web page development application includes an HTML container object, a text storage object, an HTML objects array pointing to several HTML objects, a formatter object, and a display object. The HTML container object synchronizes the functions of the all the other objects, and also provides the event handling and user input application programming interface (API) for the application layer. Each HTML object keeps both the information necessary for generating the source view, such as the HTML attributes which depend upon the particular object kind, and the information necessary for its display, such as its position and size.

In the resize operation described above, the event handling proceeds as follows in the object-oriented embodiment. The web page development application receives the mouse event, such as mouse up or mouse down, and passes it to the main HTML container object. The HTML container object determines which HTML object has been selected, if any, and passes the event to the selected HTML object. The HTML object checks if the mouse is in one of its resize boxes, if not it returns the control to the HTML container object, otherwise it changes its size by the amount corresponding to the mouse movement (if any) and notifies the HTML container object that its size has changed. The HTML container object, in response to the size change notification, calls the formatter object to update the necessary lines ends and the HTML objects positions. The input to the formatter includes the character offset at which the modifications happened. The formatter's action is to update lines ends, lines heights, and HTML objects positions. The formatter output is the range of the lines that need to be redrawn to reflect the modifications. For maximum performance, the formatter calculates the lines ends and objects positions only for the lines and objects that are currently visible on the screen and then continues the formatting of any remaining lines, if necessary, as a background task. The formatter object runs in a separate thread. The HTML container object then calls the display object passing it the range of lines that need to be redrawn to reflect the object resize operation.

Although the present invention has been described in its presently preferred embodiment, that embodiment is offered by way of example, not by way of limitation. It is to be understood that various additions and modifications can be made without departing from the spirit and scope of the present invention. For example, although the present invention has been described with respect to HTML browsers, it is to be understood that the present invention can be applied to browsers using other descriptor languages. Accordingly, all such additions and modifications are deemed to lie with the spirit and scope of the present invention as set out in the appended claims.

What is claimed is:

1. A method for generating a descriptor language representation of a graphics presentation through use of a presentation development application, comprising:
 (a) using the presentation development application to generate a display of the graphics presentation;
 (b) using the presentation development application to generate a simultaneous display of a descriptor language source view corresponding to the displayed graphics presentation; and (c) using the presentation development application to maintain an optimized meta-structure for representing said graphics presentation, said optimized meta structure including:
  a text storage component for containing text characters of said graphics view;
  an HTML object array containing at least one object that is shared by a series of said text characters; and
  a line array for representing a screen layout said line array including a character offset of last character in a given line, a pixel height of the line and a pointer to an entry in a line layout cache.

2. A method as in claim 1, further comprising:
(d) using the presentation development application to generate a first thread adapted to receive user input specifying a modification to be made to the displayed graphics presentation; and
(e) using the presentation development application to generate a second thread adapted to update the displayed graphics presentation in accordance with the received user input specifying said modification to the displayed graphics presentation, said second thread executing in parallel to said first thread;
wherein said second thread updates the displayed graphics presentation by operating on and modifying only those entries of said HTML object array and said line array of the optimized meta-structure that have been received by the first thread during receiving of user input.

3. A combined graphics and graphics descriptor development computer system for providing automated synchronization between a real time editable presentation of a graphics view and a real time editable display of a corresponding descriptor language view, said system comprising:
  (a) an optimized meta-structure containing a real time editable, first representation of a current graphics view, where the first representation is automatically transformable into a displayed graphics view said optimized meta-structure including:
    a text storage component for containing text characters of said graphics view;
    an HTML object array containing at least one object that is shared by a series of said text characters; and
    a line array for representing a screen layout, said line array including a character offset of last character in a given line, a pixel height of the line and a pointer to an entry in a line layout cache;
  (b) a descriptor language character array containing a simultaneous editable, second representation of a current descriptor language view, where the second representation is automatically transformable into a displayed descriptor language view;
  (c) a first translator for converting the second representation in the descriptor language character array of the current descriptor language view for storage in the optimized meta-structure as a correspondingly synchronized first representation of an updated graphics view that corresponds to said second representation of the current descriptor language view; and
  (d) a second translator for converting the first representation in the optimized meta-structure of the current graphics view for storage in the descriptor language character array as a correspondingly synchronized second representation of an updated descriptor language view that corresponds to said first representation in the meta-structure of the current graphics view.

4. The development system of claim 3 wherein said meta-structure includes:
  (a.1) a first array of one or more of object runs organized according to an object processing sequence of the current graphics view;
  (a.2) a second array of one or more object attribute designators for designating object attributes to respective ones of displayable object runs of the first array; and
  (a.3) a third array of one or more displayable line attribute designators for designating line attributes to respective ones of graphics view display lines, each graphics view display line containing parts or more of said displayable object runs of the first array, and the displayable line attribute designators including designators of display line height.

5. The development system of claim 4 wherein said object runs are selected from the group consisting of: a text run, an image character, a separator line, a java applet, a radio button, a check box, and a table.

6. The development system of claim 4 wherein said object attribute designators are selected from the group consisting of: image location, image width, image length, image border position, a pointer to an image, text face type, text color, text font, and separator line attributes.

7. A machine instructing apparatus for instructing an instructable machine to carry out within execution of one application program, a combined graphics and graphics descriptor developing process that provides for automated synchronization between a real time editable display of a graphics view and an editable display of a descriptor language view, said machine-implemented, developing process comprising:
  (a) maintaining an optimized meta-structure that contains a real time editable representation of a current graphics view said optimized meta-structure including:
    a text storage component for containing text characters of said graphics view;
    an HTML object array containing at least one object that is shared by a series of said text characters; and
    a line array for representing a screen layout, said line array including a character offset of last character in a given line, a pixel height of the line and a pointer to an entry in a line layout cache; and
  (b) simultaneously maintaining a descriptor language character array that contains an editable representation of a current descriptor language view corresponding to the current graphics view.

8. The machine instructing apparatus of claim 7 wherein said developing process further comprises:
  (c) converting the contents of the descriptor language character array for storage in the meta-structure as a correspondingly updated representation of the graphics view.

9. The machine instructing apparatus of claim 8 wherein said developing process further comprises:
  (d) converting the contents of the meta-structure for storage in the descriptor language character array as a correspondingly updated representation of the descriptor language view.

10. The machine instructing apparatus of claim 9 wherein said step (d) of converting the contents of the meta-structure occurs in response to cuing of a stale descriptor language view.

11. The machine instructing apparatus of claim 8 wherein said step (c) of converting the contents of the descriptor language character array occurs in response to cuing of a stale graphics view.

12. The machine instructing apparatus of claim 7 wherein said developing process further comprises:
(c) converting the contents of the meta-structure for storage in the descriptor language character array as a correspondingly updated representation of the descriptor language view.

13. The machine instructing apparatus of claim 7 wherein said step (a) of maintaining a meta-structure includes:
(a.1) maintaining a first array of one or more of object runs organized according to an object processing sequence of the graphics view;
(a.2) simultaneously maintaining a second array of one or more object attribute designators which designate object attributes to respective ones of displayable object runs of the first array; and
(a.3) maintaining a third array of one or more displayable line attribute designators which designate line attributes to respective ones of graphics view display lines, each graphics view display line containing parts or more of said displayable object runs of the first array, and the displayable line attribute designators including designators of display line height.

14. The machine instructing apparatus of claim 13 wherein said substep (a.3) of maintaining the third array includes:
(a.3a) keeping track of new and/or resized display lines created in the updated graphics view as a result of real time edits made to a current representation of the graphics view or as a result of real time edits made to a current representation of the descriptor language view.

15. A machine-implemented method for changing in real time a browser view of a web page under development, said method comprising:
(a) presenting a browser view on a display;
(b) generating an input thread adapted for resizing a graphical object in the browser view in response to a cursor dragging operation within the browser view;
(c) updating the browser view in real time during the cursor dragging operation; and
(d) generating a formatter thread that executes in parallel to said input thread said formatter thread adapted to simultaneously update in real time and during the cursor dragging operation, an optimized meta-structure that corresponds to the browser view, where an updated meta-structure can be used to automatically generate descriptor language source code corresponding to the updated browser view and where said optimized meta-structure includes:
a text storage component for containing text characters of said graphics view;
an HTML object array containing at least one object that is shared by a series of said text characters; and
a line array for representing a screen layout said line array including a character offset of last character in a given line, a pixel height of the line and a pointer to an entry in a line layout cache that stores selected line layouts;
wherein said formatter thread operates on and modifies only those entries of said HTML object array and said line array that have been updated by the input thread during the cursor dragging operation.

16. The browser view changing method of claim 15 wherein the browser view updating step (c) includes:
(c.1) redrawing the graphical object in real time during the cursor dragging operation; and
(c.2) formatting and redrawing text surrounding the graphical object in real time during the cursor dragging operation.

17. The browser view changing method of claim 15 wherein the browser view updating step (c) includes:
(c.1) line formatting a contiguous set of display lines having modified contents, modified margins, or modified line ends; and
(c.2) drawing the line-formatted contiguous set of display lines.

18. The browser view changing method of claim 15 wherein the browser view updating step (c) includes:
(c.1) line formatting a contiguous set of display lines having modified contents, modified margins, or modified line ends; and
(c.2) re-drawing the line-formatted contiguous set of display lines; and
(c.3) moving display lines subsequent to the redrawn contiguous set of display lines to a new screen position.

19. A computer readable storage medium comprising: computer readable program code embodied on said computer readable storage medium, said computer readable program code being structured for instructing an instructable machine to automatically generate a descriptor language representation of a graphics presentation under development, where said machine generation of the descriptor language representation comprises:
(a) displaying a graphics view;
(b) simultaneously displaying under a same application program, a descriptor language source view corresponding to the graphics view;
(c) maintaining an optimized meta-structure for representing said graphics view, said optimized meta-structure including:
a text storage component for containing text characters of said graphics view;
an HTML object array containing at least one object that is shared by a series of said text characters; and
a line array for representing a screen layout said line array including a character offset of last character in a given line, a pixel height of the line and a pointer to an entry in a line layout cache that stores selected line layouts;
(d) receiving user input presented through the graphics view and specifying modification to the graphics view;
(e) updating the optimized meta-structure to reflect said user input and modifications to the graphics view;
(f) processing said optimized meta-structure in order to generate an updated graphics view in response to the user input specifying modification to the graphics view; and
(g) updating under control of said same application program, the descriptor language source view in response to said updating of the graphics view.

20. The computer readable storage medium of claim 19 wherein said step (e) of updating the descriptor language source view occurs in further response to receipt of a source view synchronization cue.

21. The computer readable storage medium of claim 20 wherein the source view synchronization cue consists of a single action selection of the source view via a mouse click, or depression of a pre-designated keyboard key, or a mouse selection of a pre-designated application control button.

* * * * *

UNITED STATES PATENT AND TRADEMARK OFFICE
CERTIFICATE OF CORRECTION

| | | |
|---|---|---|
| PATENT NO. | : 7,237,193 B1 | Page 1 of 1 |
| APPLICATION NO. | : 10/255310 | |
| DATED | : June 26, 2007 | |
| INVENTOR(S) | : Essam Zaky and Sami Ben-Romdhane | |

It is certified that error appears in the above-identified patent and that said Letters Patent is hereby corrected as shown below:

On the Title page, at Item 54, replace "UNIFIED PROGRAM FOR SIMULTANEOUSLY DISPLAYING GRAPHICALLY-EDITABLE GRAPHICS PRESENTATION AND LINGUISTICALLY-EDITABLE LINGUISTIC DEFINITION OF THE GRAPHICS PRESENTATION AND FOR SYNCHRONIZING THE GRAPHICS PRESENTATION AND THE LINGUISTIC DEFINITION TO ONE ANOTHER" with --DISPLAYING THE SIMULTANEOUS EDITING OF A MARKUP LANGUAGE DOCUMENT IN REALTIME USING TEXT, AND GRAPHIC SCREENS--;

In Column 13, Claim 1, Line 9, between "layout" and "said", insert --,--;
In Column 15, Claim 15, Line 46, between "thread" and "said", insert --,--;
In Column 15, Claim 15, Line 58, between "layout" and "said", insert --,--; and
In Column 16, Claim 19, Line 41, between "layout" and "said", insert --,--.

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,237,193 B1
APPLICATION NO. : 10/255310
DATED : June 26, 2007
INVENTOR(S) : Essam Zaky and Sami Ben-Romdhane It is certified that error appears in the above-identified patent and that said Letters Patent is hereby corrected as shown below:

On the Title page, at Item 54 and Column 1 lines 1-10, replace "UNIFIED PROGRAM FOR SIMULTANEOUSLY DISPLAYING GRAPHICALLY-EDITABLE GRAPHICS PRESENTATION AND LINGUISTICALLY-EDITABLE LINGUISTIC DEFINITION OF THE GRAPHICS PRESENTATION AND FOR SYNCHRONIZING THE GRAPHICS PRESENTATION AND THE LINGUISTIC DEFINITION TO ONE ANOTHER" with --DISPLAYING THE SIMULTANEOUS EDITING OF A MARKUP LANGUAGE DOCUMENT IN REALTIME USING TEXT, AND GRAPHIC SCREENS--;

In Column 13, Claim 1, Line 9, between "layout" and "said", insert --,--;
In Column 15, Claim 15, Line 46, between "thread" and "said", insert --,--;
In Column 15, Claim 15, Line 58, between "layout" and "said", insert --,--; and
In Column 16, Claim 19, Line 41, between "layout" and "said", insert --,--.

This certificate supersedes the Certificate of Correction issued March 18, 2008.

Signed and Sealed this

Fifteenth Day of April, 2008

JON W. DUDAS
*Director of the United States Patent and Trademark Office*